(No Model.)

J. KLOPP.
TIRE BOLTER.

No. 566,520.  Patented Aug. 25, 1896.

Witnesses  Inventor
B. P. Shepherd  John Klopp
W. E. Gooley  By Paul & Hawley
  his attorneys

UNITED STATES PATENT OFFICE.

JOHN KLOPP, OF HOPKINS, MINNESOTA.

TIRE-BOLTER.

SPECIFICATION forming part of Letters Patent No. 566,520, dated August 25, 1896.

Application filed April 17, 1896. Serial No. 587,959. (No model.)

*To all whom it may concern:*

Be it known that I, JOHN KLOPP, a citizen of the United States, and a resident of Hopkins, in the county of Hennepin and State of Minnesota, have invented certain new and useful Improvements in Tire-Bolters, of which the following is a specification.

This invention relates to devices designed for putting on or taking off the nuts from the bolts that hold wheel-tires in position; and the invention consists generally in the constructions and combinations hereinafter described, and particularly pointed out in the claim.

Figure 1:
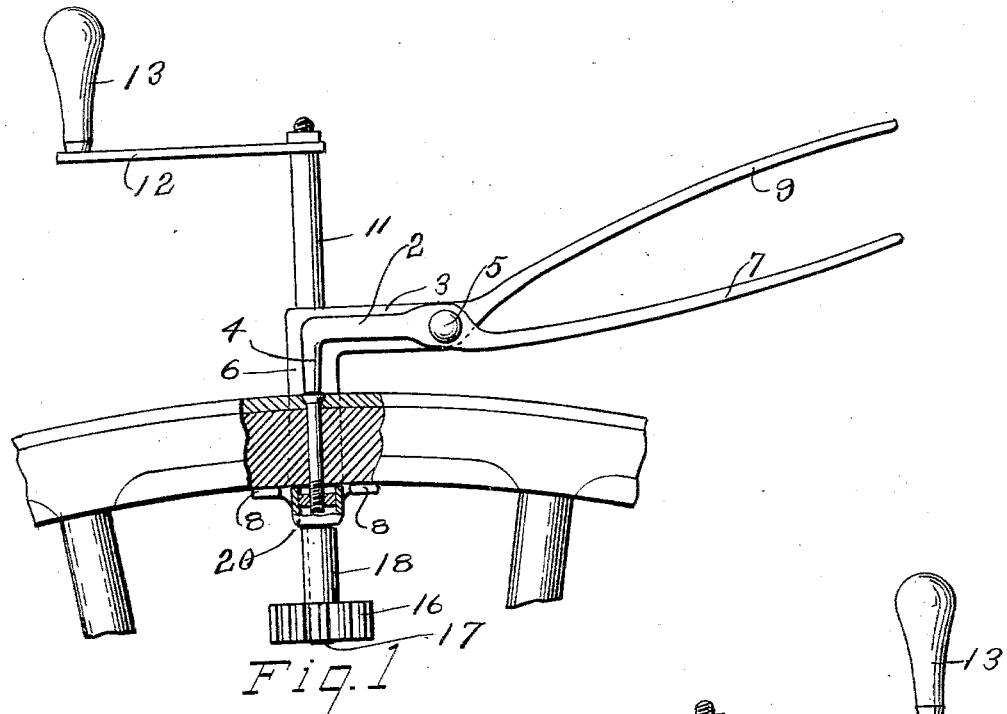
Figures 2, 3:
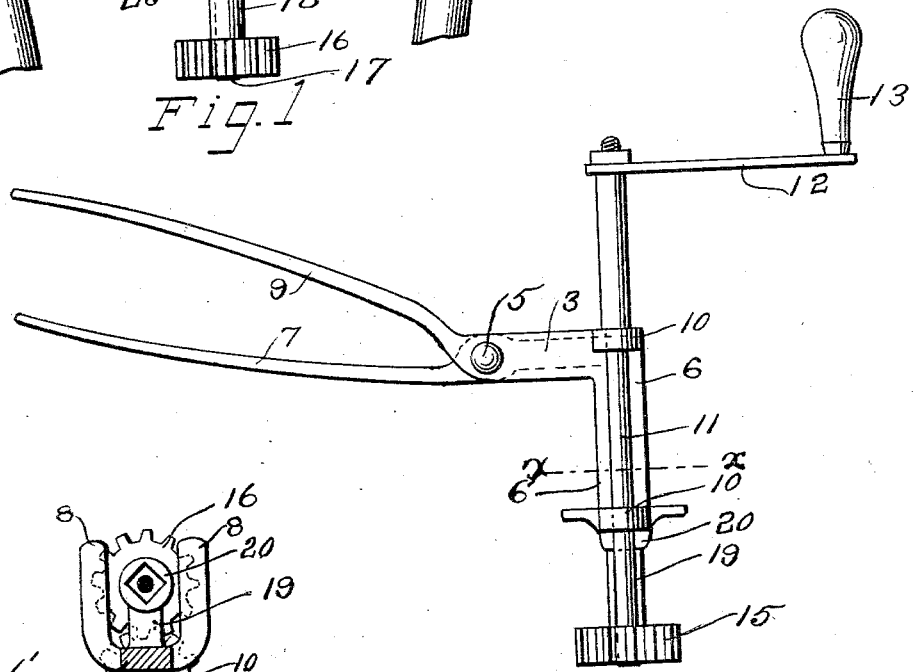

In the drawings forming part of this specification, Figure 1 is a plan view of a portion of a vehicle-wheel as it will usually be supported in a horizontal position upon a suitable support when the tire is being put on or being taken off, and showing also in plan view my improved device with the wrench portion thereof in section, and showing it applied for the purpose of putting on or taking off the nut from one of the bolts of the wheel. Fig. 2 is an under-side view of the tool. Fig. 3 is a transverse section on the line $x\ x$ of Fig. 2.

In the drawings, 2 and 3 represent the levers, which are pivoted together at 5 and the ends of which form suitable handles 7 and 9. The lever 2 is provided with the end 4, which is turned at right angles to the main part of the lever and is brought to a point that is small enough to rest entirely upon the head of the bolt. The lever 3 is provided with the right angle portion 6, which extends under the end 4 of the lever 2, and is of sufficient length so that when the wheel is lying in a horizontal position it will extend under the rim of the wheel to the inside thereof. The inner end of the right-angle portion 6 of the lever 3 is provided with the upturned ends 8 8, and these ends, when the tool is in position with the end 4 of the lever 2 bearing upon the head of the bolt, will come upon opposite sides of said bolt and bear upon the inner surface of the rim of the wheel, so that by applying pressure to the handles 7 and 9, with the tool in position shown in Fig. 1, sufficient power may be applied to the head of the bolt to prevent the bolt from turning while the nut is being put on or taken off.

The under side of the portion 6 of the lever 3 is provided with the lugs or projections 10, in which is journaled a shaft 11, that extends out beyond the lever 3 and is provided at its end with a crank-arm 12 and handle 13. The inner end of the shaft 11 is provided with a gear-wheel or pinion 15, which meshes with a similar pinion 16 upon a short shaft 17, mounted in a sleeve 18, that is secured upon a suitable support 19, formed or secured to an extension 6' of the portion 6 of the lever 3. The shaft 17 carries at its inner end a socket 20, that is adapted to fit over the nut on the inner end of the tire-bolt.

The operation of the device will be readily understood from the foregoing detail description.

The nuts may be readily removed or put in place, as desired, and the tire-bolt is firmly clamped by means of the levers 2 and 3, while the socket which engages the nut cannot, under any circumstances, come in contact with the rim of the wheel; but the upturned arms 8, engaging the inner surface of the rim, permit sufficient pressure to be applied to the tire-bolt to hold it firmly in position, while the socket by which the nut is turned remains perfectly free.

I claim as my invention—

The combination, with the levers 2 and 3 provided with the handles 7 and 9, pivoted together at 5, the lever 2 being provided with the end 4 arranged to engage the head of the tire-bolt, the lever 3 being provided with a part 6 having upturned end 8, the shaft 11, journaled in bearings on the under side of said part 6, and provided with the crank 12 and handle 13, and at its opposite end with a pinion 15 the shaft 17, mounted in a suitable support upon the extension 6' of the part 6, and provided with the socket 20, and with the pinion 16 meshing with said pinion 15, and said ends 8 being adapted to bear upon the inner surface of the felly whereby by means of the levers 2 and 3 the device may be securely clamped in position, substantially as described.

In testimony whereof I have hereunto set my hand this 14th day of April, A. D. 1896.

JOHN KLOPP.

In presence of—
A. C. PAUL,
M. E. GOOLEY.